Dec. 20, 1932.  K. V. EKLOV  1,891,527

PAINT STRIPING DEVICE

Filed Sept. 25, 1930  2 Sheets-Sheet 1

INVENTOR.
Karl V. Eklov
BY Myron J. Dikeman
ATTORNEY.

Dec. 20, 1932.                K. V. EKLOV                1,891,527
                        PAINT STRIPING DEVICE
                        Filed Sept. 25, 1930            2 Sheets-Sheet 2

INVENTOR.
Karl V. Eklov
BY Myron J. Dikeman
ATTORNEY.

Patented Dec. 20, 1932

1,891,527

UNITED STATES PATENT OFFICE

KARL V. EKLOV, OF DETROIT, MICHIGAN

PAINT STRIPING DEVICE

Application filed September 25, 1930. Serial No. 484,283.

The object of my invention is to produce a paint striping device for making fine stripe lines over painted surfaces, such as is required for striping automobile bodies and similar work, where a very fine stripe line is required.

Another object is to produce a paint striping device provided with a gravity liquid feed, controlled by special spring restrainer and shields.

A further object is to produce paint striping disc, capable of producing a fine clear cut line when applied to a painted surface.

A still further object is to produce a paint striping device formed of a rotatable striping disc operating within a spring disc shield, and so designed as to allow the striping device to be operated in either direction.

These several objects are attained in the preferred form by the construction and arrangement of parts more fully hereinafter set forth.

Similar parts on all drawings are marked by similar numerals or letters.

Figure 13:
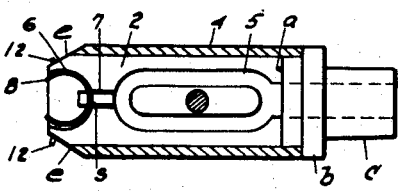
Figure 12:
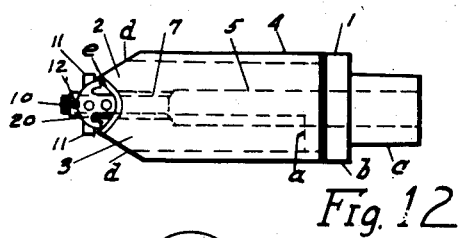

Fig. 13 also shows another form of double paint channel passage as may be formed within the main section of the striping head casing providing means for mounting a tool guide post therein.

Figure 14:
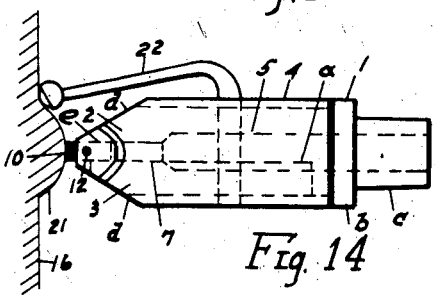

Fig. 14 is an edge view of an assembled striping head showing a tool guide mounted thereon.

Figure 16:
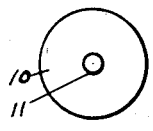
Figure 15:
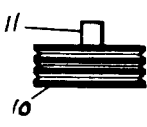
Figure 17:
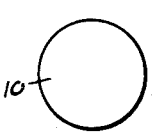

Figs. 15, 16 and 17 show an enlarged detailed construction of the pinned surface striping disc and pivot means for mounting same within the head casing.

Figure 18:

Fig. 18 shows an alternate form of striping disc of similar structure except provided with double pivots.

Figure 19:

Fig. 19 is an edge view of an alternate form of striping disc showing the construction as may be applied to larger and coarser wheel discs.

It is known that there are other paint striping devices utilizing a rolling striping disc, but not of the special disc construction involving an inclosing disc shield and liquid channel springs, the wheel operating purely by capillary attraction of the paint liquid within the pinned disc circumference.

In general my device comprises a rotatably mounted disc formed with the circumference covered with finely spaced pin like projections, said disc being mounted within a circular chamber at the end of a paint liquid channel formed within a striping head casing, said disc being partially inclosed within a spring disc shield capable of close adjustment to the disc circumference, for regulating the paint passages therethrough. A gravity feed tank is mounted on the casing and connected to the paint liquid channel by suitable passages.

I will described more fully the detailed construction of my device referring to the drawings and the marks thereon.

Figure 2:
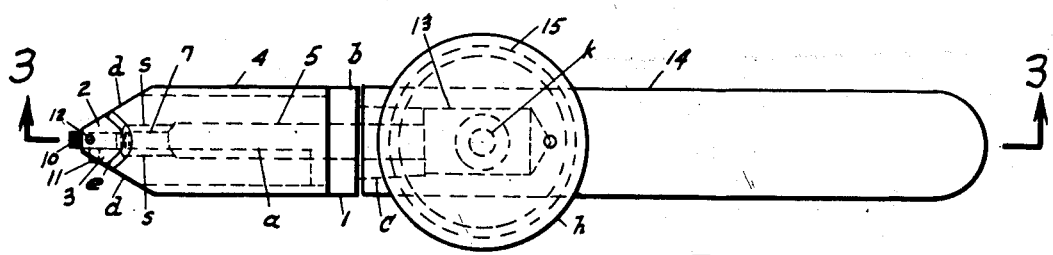
Fig. 2 is a top view of the assembled device showing the relative position of the working parts.
Figure 1:
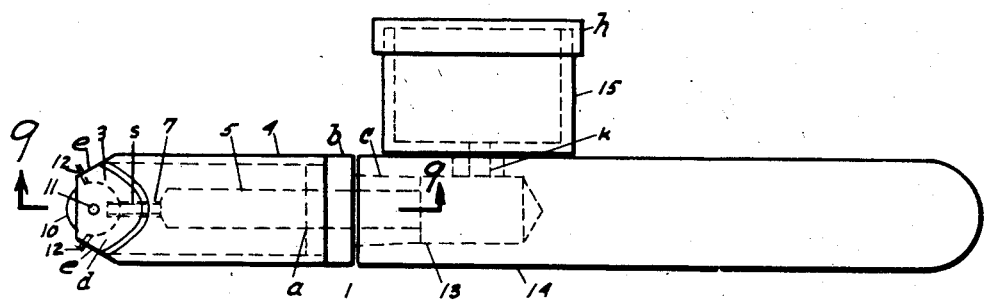
Fig. 1 is a side view of an assembled device showing the general arrangement of the exterior parts.
Figure 3:
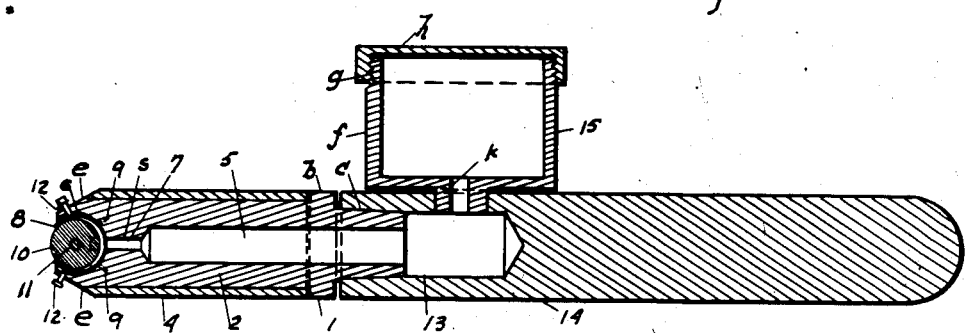
Fig. 3 is a sectional view lengthwise of the assembled device taken on the line 3—3 of Fig. 2 showing the interior paint passages and operating mechanism.
Figure 4:
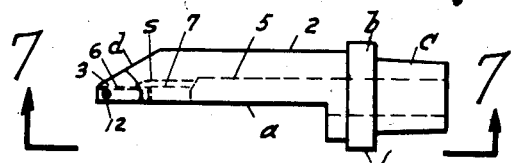
Fig. 4 is an edge view of the main section of the striping head casing showing the relative position of the paint passages and means for assembling the device.
Figure 6:
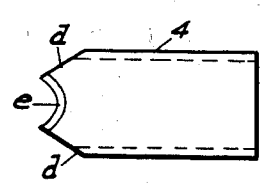
Fig. 6 is a side view of a tubular thimble designed for inclosing the two sections of the striping head casing, when assembled, for holding them together.
Figure 5:
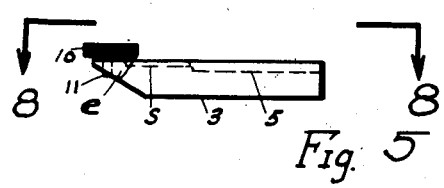
Fig. 5 is an edge view of the striping head casing side bearing block showing the striping disc mounted therein.

The casing —1— is made of metal and comprises a head block —2—, side bar —3— and clamping thimble —4—, all assembled as a single solid member. The head block —2— is preferably made from a cylindrical metal plug having one side section —a— cut therefrom as indicated in Fig. 4, and formed with a collar —b— and taper shank —c— at one end thereof. The side bar —3— as shown in Fig. 5 is fitted within the side cut —a— of the head block —2—, forming a full, true cylindrical plug section thereof, and is held securely in place by the tubular thimble —4— tightly fitted thereon, engaging the collar —b— and clamping the two plug sections together as a solid member. The outer end of the casing —1— is formed with chamfered walls —d— and —e— as indicated in Figs. 1 and 2, forming a narrow, rectangular end wall thereon.

The cylindrical exterior of the casing is preferred because of appearance and simplicity in manufacturing, although a flattened or rectangular cross-section may be used if desired, as the actual exterior casing form is not material to my invention.

Figure 7:
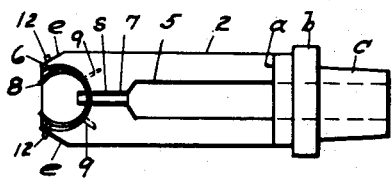
Fig. 7 is a side view of the casing section as shown in Fig. 4, taken on the line 7—7 showing the paint passages as formed around one side of the spring disc shield.
Figure 8:
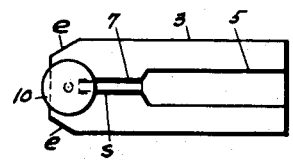
Fig. 8 is a side view of the casing bearing block as shown in Fig. 5, taken on the line 8—8 showing the paint passage extended beyond the paint striping disc edge.
Figure 9:
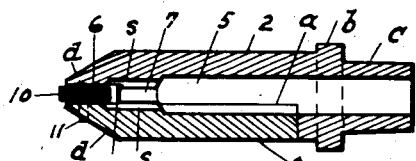
Fig. 9 is a sectional view lengthwise of the striping head casing taken on the line 9—9 of Fig. 1, showing the assembled sections and the relative position of the passages to the striping disc and spring disc shield.

Through the center of the assembled plug sections —2— and —3—, along the plug axis, is formed an elongated channel passage —5—, extending from the taper plug end —c— to nearly the entire length of the plug section. Within the opposite end of the plug section is formed a short cylindrical chamber —6—, symmetrically positioned across the cylindrical casing axis and through the narrow rectangular end wall, forming a rectangular wall opening therein. A restricted channel passage —7— provided with thin slotted side ports —s— is formed within the plug end, connecting the channel —5— with the cylindrical chamber —6—, said slotted side ports —s— being extended along both end chamber walls as indicated in Figs. 7 and 8. Within the said chamber —6— is fitted an open circular spring shield —8—, made of thin bar metal, of a width to completely fill the chamber recess walls, forming contact with both chamber end walls, and is fixedly attached thereto by small pins —9—, or by brazing the metals together, the spring opening being positioned to coincide with the end wall opening of the casing head. Pivotally mounted within the chamber —6—, inside the spring shield —8—, is a small pinned surfaced striping disc —10—, of a diameter slightly less than the inclosing spring shield —8—, said disc being positioned therein to project one disc edge out through the head casing end opening. The disc —10— is fitted to engage the chamber end walls, forming liquid tight joints therewith, yet free to rotate within the chamber —6— on its supporting pivots —11—. The outer circumferential rim of the disc is cylindrical, and is formed with closely spaced pin projections as illustrated in Figs. 15 to 19 inclusively. Serviceable pin projections are readily formed by rolling a knurling tool over a finely threaded rim surface, or a surface formed of a series of sharp, parallel adjacent ridges, thus separating the entire rim surface into fine pointed projections. Small adjusting screws —12— are mounted through the chamber side walls, opposite the ends of the shield spring —8—, for engaging the spring ends and adjusting same to a close contact with the pinned rim of disc —10—. It is desirable for manufacturing advantages to form the cylindrical chamber —6— wholly within the head block section —2—, and mount the disc —10— on the end of the side block —3— by a single pivot —11—, the wall cut —a— of the head block being positioned to coincide with one chamber end wall, although this exact formation is not material to the operation of my device.

The taper end —c— of the head casing —1— is fitted within a tapered end recess —13— of a suitable handle section —14—, said tapered ends being adapted for securely retaining the head section therein, yet allow the same to be readily turned to different positions within the handle. On the top side of handle —14— is fixedly mounted a gravity paint tank —15—, preferably made of an open metal cup —f—, formed with the threaded end —g—, and provided with a suitable screw cap —h—. The tank —15— may be attached to the handle by any suitable means, and is provided with an outlet nipple —k— opening directly into the handle recess —13—.

By filling the tank —15— with suitable striping paint, the paint liquid will flow by gravity into and through the channels —5— and —7—, through the side ports —s— and around the edges of the spring shield —8— and into the chamber —6—, filling the space between the back of the disc —10— and the shield wall, the paint liquid entering the pinned surface of the disc rim by capillary attraction, and the surplus liquid paint being restrained by the shield spring ends as adjusted by the screws —12—. As the disc —10— is placed against a painted metal surface —16— as indicated in the Fig. 14, and moved therealong in either direction, said disc is caused to rotate on its supporting pivot —11— and will draw the paint liquid from the chamber —6— beneath the ends of the spring shield —8—, bringing same in contact with the painted surface —16—, causing a stripe line to be impressed thereon. Because of the adhesiveness of the paint to a painted surface, a sufficient quantity of liquid paint will be drawn from the pinned surface of the disc to form a sharp, smooth edged line, and without excess paint, or leaving paint blotches, as would result with a smooth or ordinarily grooved disc circumferential surface.

Figure 10:
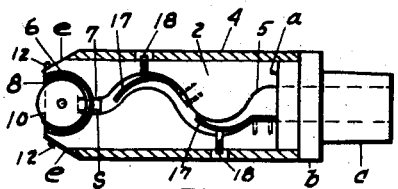
Fig. 10 shows an alternate form of paint channel passage as may be formed within the main section of the striping head casing having adjustable channel restraining springs mounted therein.
Figure 11:
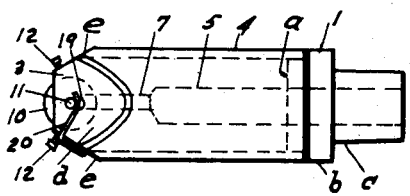
Figs. 11 and 12 show an alternate form of striping head with the paint striping disc mounted within a slotted bearing and supported by an attached pivot spring, designed for completely closing the paint passages when the device is not in use.

When a very fine stripe line is desired and a thin marking liquid is used, the liquid channel —5— may be formed with curved sections as shown in Fig. 10, and provided with adjustable restraining springs —17— mounted therein, said springs —17— being adjusted to regulate the size of the passage opening by the adjusting screws —18— mounted through the casing side walls. The operation is the same as heretofore described.

Where the striping device is adapted for intermittent use, it has been found desirable to close the disc wall passages when not in use, this being accomplished by providing slotted pivot bearings —19— in the head casing walls, supporting the disc pivots —11— on the spring arms —20— fixedly mounted on the casing end. The spring arms —20— will force the disc —10— to engage the ends of the spring shield —8— and close the passage opening, but the disc will recede within the pivot slots —19— if pressure is applied to the disc rim when the striping device is being used, and will then allow sufficient paint to pass therethrough as heretofore described.

When the striping device is to be used for placing a stripe line along a beaded section —21— as illustrated in Fig. 14, a tool guide arm —22— may be mounted thereon by any convenient means, for guiding the device uniformly therealong.

For producing fine stripe lines, it is found a small disc of about one quarter of an inch in diameter formed with needle like point projections, arranged as indicated in the enlarged detail Figs. 15 and 18, will produce a smooth edged, clear cut line if the paint is restricted to the pinned disc surface. For heavier lines coarser teeth may be employed as indicated in Fig. 19, although the smoothness of the line may be impaired.

Having fully described my paint striping device, what I claim as my invention and desire to secure by Letters Patent is:

1. A paint striping device adapted for striping a plane surface, comprising a suitable casing member formed with a liquid passage channel therein opened at one casing end, a pinned surface cylindrical disc rotatably mounted within the open end of said casing channel positioned with one disc edge projected therefrom, a circumferential disc shield mounted in said channel passage end opening partially inclosing said disc rim, means mounted on the casing member for engaging said disc shield for adjusting same to the disc rim, and means mounted on the casing member for retaining and flowing liquid paint into the liquid passage channel.

2. A paint striping device adapted for striping a plane surface, comprising a suitable casing member formed with a liquid passage channel therein and opened at one casing end, a disc chamber formed within the open end of said passage channel, a circumferential disc shield fitted within said disc chamber also opened at the casing end, a pinned surface cylindrical disc rotatably mounted within said disc chamber positioned with one disc edge projected beyond the casing end opening and through said disc shield, screw means mounted in the casing end walls adjacent the disc chamber for engaging the shield ends and adjusting same to the disc rim, and a liquid retainer mounted on the top side of said casing and opening into the casing liquid passage channel.

3. A paint striping device adapted for marking a fine stripe line on plane surfaces, comprising a head casing pivotally mounted within a suitable handle and having a liquid passage channel formed therein open at the end of said head casing, a disc chamber formed within the open end of said passage channel, a circumferential disc shield fitted within said disc chamber open at the casing end, a pinned surface cylindrical disc rotatably mounted within said disc chamber inside said disc shield and positioned therein with one disc edge projected from the casing passage channel end, adjusting screws mounted in the casing end walls adjacent the disc shield capable of engaging the shield ends and adjust same to the disc rim surface, and a liquid retainer mounted on the top side of the handle section and provided with a liquid passage channel opening into said casing passage channel.

4. A paint striping device adapted for making a narrow stripe line on plane surfaces, comprising a casing member formed with a liquid passage channel through the center lengthwise thereof, said channel being open at one casing end, a cylindrical disc chamber formed within the open end of said passage channel, a circular spring circumferential disc shield mounted within said cylindrical disc chamber and open at the casing passage channel end, a pinned surface cylindrical disc rotatably mounted within said disc chamber inside said circular disc shield and projected out of the casing end, screw means mounted on the casing end for adjusting said disc shield ends to the disc rim surface, liquid restraining springs mounted within the casing liquid passage channel and means for adjusting the positions of same, guide means mounted on said casing and projected to a position opposite the projected disc edge, and means mounted on said casing for flowing liquid paint into the casing liquid passage channel.

5. A paint striping device adapted for making a fine stripe line on painted surfaces, comprising a suitable casing member formed with a liquid passage channel lengthwise through the center thereof, said channel being open at one casing end, a cylindrical disc chamber formed in the open end of said casing channel, the cylinder chamber axis being at right angles to the casing axis, an open circular spring disc shield mounted within said circumferential disc chamber, fitted to the circular chamber wall and open at the chamber end, a pinned surface cylinder disc formed with side pivots rotatably mounted within said disc chamber inside the disc shield in slotted wall bearings so as to project the disc edge outside the casing end opening, spring pivot members mounted on said casing engaging the disc pivots in a manner capable of moving said disc outward, screw adjusting members mounted in the casing walls positioned to engage the spring shield ends and adjust same to the disc rim, a liquid paint chamber mounted on said casing member and opening into the casing liquid passage channel, and means for regulating the paint flow.

In witness whereof I sign this specification.

KARL V. EKLOV.